(12) United States Patent
Kaneko et al.

(10) Patent No.: US 11,278,849 B2
(45) Date of Patent: Mar. 22, 2022

(54) GRAPHENE NANOWINDOW STRUCTURE AND METHOD FOR PRODUCING HIGHLY PURE GAS

(71) Applicants: Shinshu University, Matsumoto (JP); Kotobuki Holdings Co., Ltd., Kitakyushu (JP)

(72) Inventors: Katsumi Kaneko, Nagano (JP); Fernando Vallejos-Burgos, Nagano (JP); Toshio Takagi, Kitakyushu (JP); Katsuyuki Murata, Kitakyushu (JP)

(73) Assignees: SHINSHU UNIVERSITY, Nagano (JP); KOTOBUKI HOLDINGS CO., LTD., Fukuoka (JP)

( * ) Notice: Subject to any disclaimer, the term of this patent is extended or adjusted under 35 U.S.C. 154(b) by 88 days.

(21) Appl. No.: 16/629,788

(22) PCT Filed: Jul. 4, 2018

(86) PCT No.: PCT/JP2018/025301
§ 371 (c)(1),
(2) Date: Jan. 9, 2020

(87) PCT Pub. No.: WO2019/013059
PCT Pub. Date: Jan. 17, 2019

(65) Prior Publication Data
US 2021/0060499 A1   Mar. 4, 2021

(30) Foreign Application Priority Data
Jul. 14, 2017 (JP) .............................. JP2017-138510

(51) Int. Cl.
*B01D 71/02* (2006.01)
*C01B 32/194* (2017.01)
(Continued)

(52) U.S. Cl.
CPC ......... *B01D 71/021* (2013.01); *B01D 53/228* (2013.01); *B01D 71/028* (2013.01);
(Continued)

(58) Field of Classification Search
CPC .................................................. C01P 2002/52
See application file for complete search history.

(56) References Cited

U.S. PATENT DOCUMENTS 9,527,043 B2   12/2016   Choi et al.
2011/0240946 A1   10/2011   Miao et al.
(Continued)

FOREIGN PATENT DOCUMENTS

CN   104203835 A   12/2014
CN   104204796 A   12/2014
(Continued)

OTHER PUBLICATIONS

Vallejos-Burgos, Fernando et al., "Air separation with graphene mediated by nanowindow-rim concerted motion", Nature Communications, May 2018, vol. 9 (1812), 9 pages. (Year: 2018).*
(Continued)

*Primary Examiner* — Jason M Greene
(74) *Attorney, Agent, or Firm* — Haynes and Boone, LLP

(57) ABSTRACT

A molecular sieve that has high selectivity and enables high-speed molecular permeation is provided. The molecular sieve has a nanowindow formed lacking a portion of carbon atoms in graphene, and one or more heteroatoms substituting for one or more carbon atoms that constitute a rim of this nanowindow, in which an electrostatic field is induced within the nanowindow by the heteroatoms, the rim of the nanowindow is relaxed in cooperation with a permeating molecule having a van der Waals' radius larger than the nanowindow, and the molecular sieve becomes permeable to the permeating molecule.

18 Claims, 8 Drawing Sheets

(51) Int. Cl.
*B01D 53/22* (2006.01)
*C01B 21/04* (2006.01)
(52) U.S. Cl.
CPC ........ *C01B 21/0444* (2013.01); *C01B 32/194* (2017.08); *C01B 2210/0012* (2013.01); *C01P 2002/52* (2013.01)

(56) References Cited

U.S. PATENT DOCUMENTS

| | | | |
|---|---|---|---|
| 2013/0270188 A1 | 10/2013 | Karnik et al. | |
| 2014/0183133 A1* | 7/2014 | Anderson | B01D 71/021 210/637 |
| 2016/0074815 A1* | 3/2016 | Sinton | B01D 71/021 95/49 |
| 2018/0290106 A1* | 10/2018 | Kubis | B01D 69/02 |
| 2020/0206692 A1* | 7/2020 | Hou | B01D 53/228 |

FOREIGN PATENT DOCUMENTS

| | | |
|---|---|---|
| CN | 104487382 A | 4/2015 |
| CN | 104649257 A | 5/2015 |
| JP | 2009-073727 A | 4/2009 |
| JP | 2013-536077 A | 9/2013 |
| JP | 2016-519036 A | 6/2016 |
| JP | 2016-538228 A | 12/2016 |
| JP | 2017-100065 A | 6/2017 |
| JP | 2017-515668 A | 6/2017 |
| WO | WO-2012-027148 A1 | 3/2012 |
| WO | WO-2015-030698 A1 | 3/2012 |
| WO | WO-2014-150359 A1 | 9/2014 |
| WO | WO-2015-172050 A2 | 11/2015 |
| WO | WO2016/002509 A1 | 1/2016 |
| WO | WO 2016/177355 A1 | 11/2016 |
| WO | WO 2017/049005 A1 | 3/2017 |

OTHER PUBLICATIONS

Extended European Search Report for EP Application No. 18831774.7 dated Mar. 3, 2021; 7 pages.
English Translation of the International Search Report and Written Opinion issued by the Japan Patent Office regarding International Application No. PCT/JP2018/025301, dated Oct. 2, 2018, 8 pages.
International Search Report and Written Opinion issued by the Japan Patent Office regarding International Application No. PCT/JP2018/025301, dated Oct. 2, 2018, 7 pages.
International Preliminary Report on Patentability and its English Translation, issued by the Japan Patent Office regarding International Application No. PCT/JP2018/025301, dated Jan. 14, 2020, 5 pages.
Vallejos-Burgos, Fernando, et al., "Air separation with graphene mediated by nanowindow-rim concerted motion", Nature Communications, May 4, 2018, vol. 9 (1812), p. 1-p. 9.

* cited by examiner a

FIRST LARGEST DIAMETER

SECOND LARGEST DIAMETER

THIRD LARGEST DIAMETER b

FIRST LARGEST DIAMETER

SECOND LARGEST DIAMETER

THIRD LARGEST DIAMETER
(SAME LENGTH AS SECOND
LARGEST DIAMETER)

US 11,278,849 B2

GRAPHENE NANOWINDOW STRUCTURE AND METHOD FOR PRODUCING HIGHLY PURE GAS

CROSS REFERENCE

This application is a United States national phase application of co-pending international patent application number PCT/JP2018/025301, filed Jul. 4, 2018, which claims priority to Japanese patent application number 2017-138510, filed Jul. 14, 2017, the entire disclosures of which are hereby incorporated herein by reference.

TECHNICAL FIELD

The present invention relates to a technology for separating molecules using a molecular sieve such as graphene.

BACKGROUND ART

In the gas separation industry, distillation is widely used in order to obtain high-purity products and supplies $N_2$, $O_2$, and noble gases of high purity to other industries; however, distillation is accompanied by a phase change of converting a liquid to a gas, and the energy consumed for this phase change is huge.

Separation processes account for 40% to 70% of both capital cost and operating cost in modern industry, and in advanced industrial countries (the United States), 8% of the total energy consumption is consumed in distillation.

Therefore, instead of molecular separation based on phase change, such as distillation, there has been a new demand for a fundamentally alternative separation technology such as membrane-based molecular separation. Membrane-based separation technologies require small installation areas for equipment and have reduced mechanical complexity compared to conventional technologies based on phase separation. In particular, energy is reduced by 90% compared to distillation, and $CO_2$ emissions can be reduced to a large extent.

One of the most promising membranes is a single-layer graphene membrane having nanoscale-sized windows (nanowindows), and since the periphery of nanowindows is composed of a single layer of carbon atoms and is a very thin film, when substances permeate the nanowindows, the nanowindows bring about ultrafast permeation without becoming an obstacle to permeation.

Graphene, which is a two-dimensional material formed from a hexagonal crystal network of closely covalently bonded carbon atoms, is considered ever increasingly important in the field of new materials. Since synthesis processes are being continuously improved, it is expected to achieve mass production of almost defect-free graphene in the near future. Due to the one-atom thickness, fastness properties, chemical stability, and a property of being easily processable to a sieve, one of the most important use applications of graphene is the use as a separation membrane.

Since a defect-free graphene sheet is impermeable even to the smallest gases such as He, it is necessary to introduce nanowindows in order to enable transportation and separation of molecules. Since a graphene having nanowindows has a single-layer structure, the resistance occurring when molecules permeate can be almost neglected, and therefore, such a graphene exhibits ultrafast molecular permeation. Accordingly, the separation efficiency exceeds the separation efficiency based on the conventional separation technologies that use membranes. There are many methods for producing a graphene-like layer including nanowindows, such as ion bombardment, template-synthesized mesh, and high-temperature oxidation. High-temperature oxidation simply requires heating up to about 600 K in an oxidizing environment, and therefore, high-temperature oxidation is simple, is capable of easily expanding the size of nanowindows, and is inexpensive (Patent Literatures 1 and 2).

Graphene with nanowindows has potential to become the most selective and highly energy-efficient membrane for molecular separation.

Furthermore, graphene having nanowindows can realize permeation resistance with which the single-atom-thick wall thereof is almost negligible, and can therefore realize ultrafast molecular permeation.

CITATION LIST

Patent Literature

Patent Literature 1: Japanese Unexamined Patent Publication No. 2013-536077
Patent Literature 2: Japanese Unexamined Patent Publication No. 2009-073727

SUMMARY OF INVENTION

Technical Problem

The present invention was achieved in order to solve the problems described above, and it is an object of the invention to provide a molecular sieve that has high selectivity and also enables high-speed molecular permeation.

Solution to Problem

According to the present invention, means for solving the above-described problems are as follows.

A graphene nanowindow structure according to a first aspect of the invention has a nanowindow formed lacking a portion of carbon atoms in graphene; and one or more heteroatoms substituting for one or more carbon atoms that constitute a rim of this nanowindow, in which an electrostatic field is induced within the nanowindow by the heteroatoms, the rim of the nanowindow is relaxed in cooperation with a permeating molecule having a van der Waals' radius larger than the nanowindow, and the graphene nanowindow structure becomes permeable to the permeating molecule.

A graphene nanowindow structure according to a second aspect of the invention has a nanowindow formed lacking a portion of carbon atoms in graphene; and one or more heteroatoms substituting for one or more carbon atoms that constitute the a of this nanowindow, in which breathing vibration is induced in a rim of the nanowindow by the heteroatoms, the rim of the nanowindow is relaxed in cooperation with a permeating molecule having a van der Waals' radius larger than the nanowindow, and the graphene nanowindow structure becomes permeable to the permeating molecule.

A graphene nanowindow structure according to a third aspect of the invention has a nanowindow formed lacking a portion of carbon atoms in graphene; and one or more functional groups added to one or more carbon atoms that constitute a rim of this nanowindow, in which an electrostatic field is induced within the nanowindow by the functional groups, the rim of the nanowindow is relaxed in cooperation with a permeating molecule having a van der Waals' radius larger than the nanowindow, and the graphene nanowindow structure becomes permeable to the permeating molecule.

A graphene nanowindow structure according to a fourth aspect of the invention has a nanowindow formed lacking a portion of carbon atoms in graphene; and one or more functional groups added to one or more carbon atoms that constitute the a rim of this nanowindow, in which breathing vibration is induced in the rim of the nanowindow by the functional groups, the rim of the nanowindow is relaxed in cooperation with a permeating molecule having a van der Waals' radius larger than the nanowindow, and the graphene nanowindow structure becomes permeable to the permeating molecule.

A graphene nanowindow structure according to a fifth aspect of the invention can switch between a permeable state of being permeable to the permeating molecule and an impermeable state of being impermeable to the permeating molecule due to the electrostatic field, the impermeable state being obtainable from the permeable state by rotating the directions of the functional groups.

A sixth aspect of the invention is a method for producing a highly pure gas by extracting permeating molecules from a mixed gas that includes permeating molecules and non-permeating molecules, the method including: supplying the mixed gas to a graphene that has a nanowindow having a van der Waals' radius smaller than the permeating molecules and the non-permeating molecules and also has, in a rim of this nanowindow, one or more of a functional group, a heteroatom, or a defective part, all of which cooperate with the permeating molecules; allowing the permeating molecules to permeate the nanowindow while preventing permeation of the non-permeating molecules, through relaxation of the nanowindow as a result of cooperation between the permeating molecules and the functional group, the heteroatom, or the defective part; and collecting the permeating molecules that have permeated the nanowindow.

Advantageous Effects of Invention

According to the first aspect of the invention, there can be provided a molecular sieve having high selectivity and enabling high-speed molecular permeation, the molecular sieve having one or more heteroatoms substituting for one or more carbon atoms that constitute the rim of a nanowindow, in which an electrostatic field is induced within the nanowindow by the heteroatoms, the rim of the nanowindow is relaxed in cooperation with a permeating molecule having a van der Waals' radius larger than the nanowindow, and the permeating molecule is allowed to permeate.

According to the second aspect of the invention, there can be provided a molecular sieve having high selectivity and enabling high-speed molecular permeation, the molecular sieve having one or more heteroatoms substituting for one or more carbon atoms that constitute the rim of a nanowindow, in which breathing vibration is induced in the rim of the nanowindow by the heteroatoms, the rim of the nanowindow is relaxed in cooperation with a permeating molecule having a van der Waals' radius larger than the nanowindow, and the permeating molecule is allowed to permeate.

According to the third aspect of the invention, there can be provided a molecular sieve having high selectivity and enabling high-speed molecular permeation, the molecular sieve having one or more functional groups added to one or more carbon atoms that constitute the rim of a nanowindow, in which an electrostatic field is induced within the nanowindow by the functional groups, the rim of the nanowindow is relaxed in cooperation with a permeating molecule having a van der Waals' radius larger than the nanowindow, and the permeating molecule is allowed to permeate.

According to the fourth aspect of the invention, there can be provided a molecular sieve having high selectivity and enabling high-speed molecular permeation, the molecular sieve having one or more functional groups added to one or more carbon atoms that constitute the rim of a nanowindow, in which breathing vibration is induced in the rim of the nanowindow by the functional groups, the rim of the nanowindow is relaxed in cooperation with a permeating molecule having a van der Waals' radius larger than the nanowindow, and the permeating molecule is allowed to permeate.

According to the fifth aspect of the invention, a permeable state of being permeable to the permeating molecule and an impermeable state of being impermeable to the permeating molecule due to the electrostatic field, the impermeable state being obtainable from the permeable state by rotating the directions of the functional groups, can be switched, and therefore, the selectivity of permeating molecules can be controlled.

According to the sixth aspect of the invention, when the mixed gas is supplied to a graphene having a nanowindow having a van der Waals' radius smaller than the permeating molecules and the non-permeating molecules and having, in the rim of this nanowindow, one or more of a functional group, a heteroatom, or a defective part, all of which cooperate with the permeating molecules; the permeating molecules are allowed to permeate the nanowindow while the non-permeating molecules are not allowed to permeate, through relaxation of the nanowindow as a result of cooperation between the permeating molecules and the functional group, the heteroatom, or the defective part; and the permeating molecules that have permeated the nanowindow are collected, the energy consumption for producing a highly pure gas can be reduced to a large extent.

DESCRIPTION OF EMBODIMENTS

Figure 1:
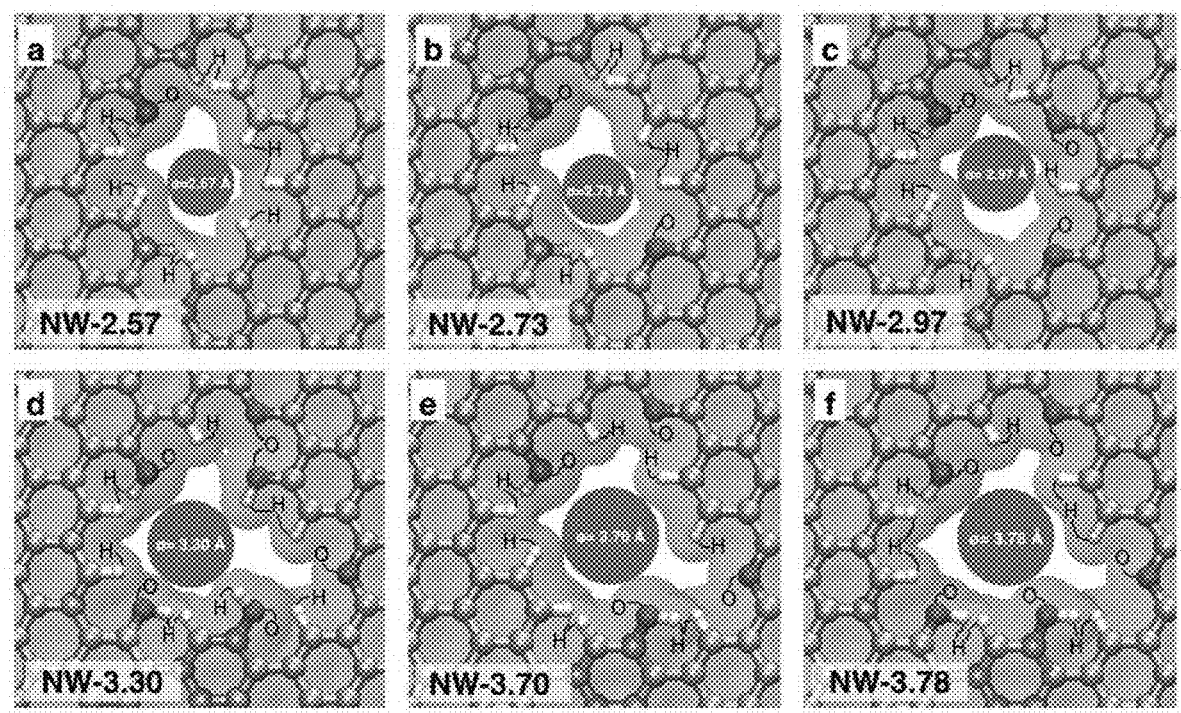
FIG. 1 is a model of a plurality of nanowindows having different sizes and distributions of functional groups, in which the van der Waals' diameters (hereinafter, may be represented by NW-x) of various nanowindows are 2.57 Å (angstrom) in (a), 2.73 Å in (b), 2.97 Å in (c), 3.30 Å in (d), 3.70 Å in (e), and 3.78 Å in (f), and (g) is a graph showing the permeation rates of molecules in the respective models.
Figure 1:
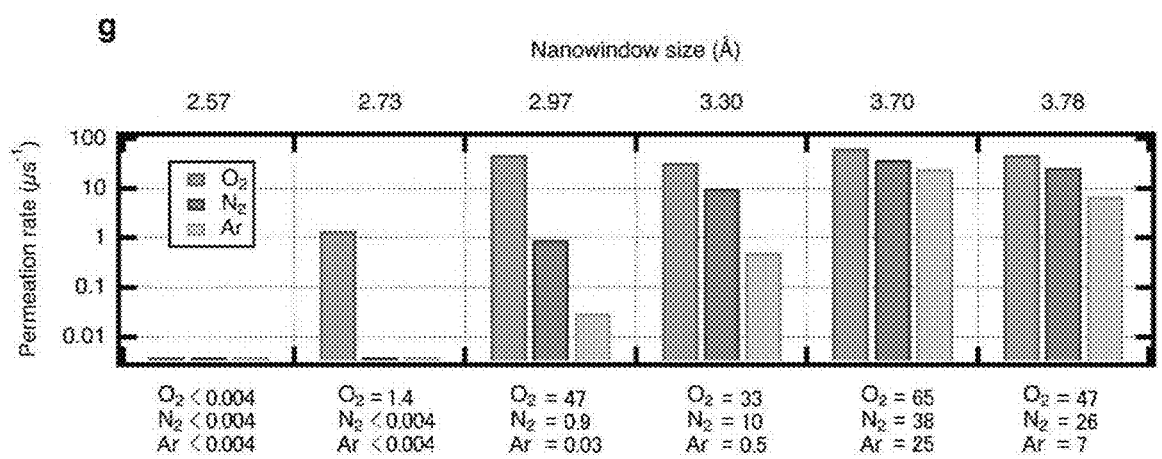

According to the present specification, the rim means the entire circumference of a nanowindow of graphene composed of carbon atoms and other atoms.

An edge means atoms constituting a portion of the rim.

A heteroatom means an atom other than hydrogen and carbon.

Examples of the heteroatom include oxygen (O), nitrogen (N), sulfur (S), phosphorus (P), chlorine (Cl), iodine (I), bromine (Br), and boron (B) atoms.

A functional group refers in particular, among general functional groups that impart chemical characteristics, to a functional group added to an atom that constitutes the rim.

As the functional group, a functional group containing a heteroatom is desired. Examples include a hydroxyl group, a carboxyl group, and a carbonyl group.

Overview

In the following, separation of molecules using a graphene nanowindow structure according to embodiments of the present invention will be explained.

In the present invention, it is noted that a flexible nanowindow having functional groups or heteroatoms at an edge of the rim exhibits a behavior that cannot be obtained with a rigid nanowindow having only carbon edges formed by a simple perforation treatment.

Due to the thermodynamic stability under ambient conditions, edges of the nanowindow do not constitute an electrically neutral rim composed of carbon atoms. A graphene membrane of the present invention becomes a flexible atomic framework by having functional groups or heteroatoms around the nanowindows.

In fact, it has been found that a molecule that is much larger than a flexible nanowindow can easily permeate the nanowindow at a very high speed of 600 $m^3 \cdot min^{-1} \cdot m^2$ (an $O_2$ molecule of 3.0 Å permeates a nanowindow of 2.7 Å). Thereby, an unprecedented $O_2:N_2$ selectivity is exhibited. Such behavior does not occur in a case in which the graphene framework is rigid.

According to the thermal distribution of kinetic energy, when it is considered that a molecule can permeate a nanowindow even in a case in which the size of the nanowindow (diameter that is not occupied by the van der Waals' radius of the rim atoms) is smaller than the effective size of the molecule, it can be said that the explanation on permeation that can be determined only by geometrical factors such as the size of the nanowindow is incorrect.

The chemical properties including a carbon functional group having a zigzag or armchair shape) of a nanowindow, particularly the rim thereof, become important factors for determining the permeation rate and selectivity of a graphene membrane for all permeable molecules.

A challenging separation of molecules having the same size but different interactions (chemical properties) provides information on the interaction between the rims of nanowindows.

Herein, main air components ($O_2$, $N_2$, and Ar) will be selected as permeating molecules. It is because on the occasion of discussing the role of nanowindows and showing an auxiliary role of the rim, such a separation has an industrial value and represents good examples of molecular interactions of different types (representing dispersion only and dispersion+static electricity, respectively).

Heteroatoms of the rim induce a strong electrostatic field within a nanowindow.

Partial charges of the heteroatoms within the rim of a nanowindow induce an electrostatic field in the order of GV/m within a nanowindow. An interaction between a molecule having a polarized charge center such as $N_2$, and this electric field brings stabilization of about 5 kJ·$mol^{-1}$, which assists in a permeation process of passing through a nanowindow. Furthermore, coordinated movement of surface functional groups at the rim of the nanowindow can accelerate permeation of a molecule having a polarized charge center.

This is contradictory to the conventional general idea that with regard to the sieving of molecules, exclusion based on size is the only phenomenon that controls separation (for example, Strathmann, H. "Introduction to Membrane Science and Technology", Wiley, 2011).

These results show that a graphene membrane having a thickness of one layer of atom has exceptional usefulness for the separation of air.

A nanowindow dynamically responds to permeating molecules. That is, the rim (circumference) can vibrate and relax during permeation of a molecule.

Such relaxation of a cyclic polyaromatic molecular nanowindow lowered the permeation energy bather by 2 to 5 times the conventional value, depending on the permeating molecule.

When a nanowindow is considered to have a structure equivalent to the structure of a non-periodic polycyclic polyaromatic molecule, the effect of relaxation is expected to be very large. It is because the structure of such a non-periodic polycyclic polyaromatic molecule is much stronger than a periodic structure and causes phonon vibration. Introduction of flexibility through relaxation of the rim of the nanowindow is important because the introduction occurs in parallel to the permeation of a molecule.

The geometric sizes and shapes of the nanowindow and a permeating molecule, as well as the chemical properties of the rim of a nanowindow and dynamics such as phonon vibration generally affect molecular permeation through the nanowindow. Particularly, since the dynamic movement of the rim and the partial charge distribution produced by heteroatoms are expected to cause selective permeation caused by molecular recognition, the roles of the edges and functional groups thereof of a nanowindow must be elucidated.

Embodiments

Graphene was treated in air for 10 minutes at 600 K, and nanowindows having a desired size were formed. Furthermore, this graphene was immersed in a 1 mol/L aqueous solution of nitric acid for one hour at 300 K, and thereby heteroatoms were introduced. The graphene was washed with ultrapure water and then was transferred onto a membrane filter made of polycarbonate, the membrane filter was mounted on a membrane filter holder, and thereby a gas molecular membrane was obtained.

For the opening and closing operation of a nanowindow that utilizes the functional groups that will be described below or the charge distribution of the nanowindow rim, application of electric charge, infrared irradiation, and the like are effective. The charge distribution of the nanowindow rim can be simply controlled by applying electric charge. For example, when the entire graphene is applied to an electron-rich state, the nanowindow rim is filled with electrons, and the nanowindow is in a closed state.

When electromagnetic waves such as infrared radiation are radiated, the functional groups undergo active rotation or libration movement by thermal motion, and the nanowindow is in a closed state. Furthermore, due to the effect of phonon occurring as a result of irradiating the nanowindow rim with electromagnetic waves, the nanowindow is in a closed state.

Furthermore, when graphene is weakly irradiated with infrared radiation and is thereby maintained in a state with high molecular permeability, irradiation with infrared radiation is stopped, and graphene is cooled while maintaining the arrangement of functional groups in an open state of the nanowindow, the nanowindow can be maintained in an open state.

In the mechanism by which a molecule larger than the nanowindow permeates the nanowindow, the electron distribution of the nanowindow rim or the functional groups changes (cooperates) as a result of an interaction between the electrons of the nanowindow rim or functional groups and the electrons of the permeating molecule, Coulombic attraction is induced between the nanowindow rim or the functional groups and the permeating molecule (relaxation), and the steric hindrance of the nanowindow rim itself can be sufficiently overcome by the kinetic energy possessed by the permeating molecule.

$O_2$ undergoes weak cooperation with the nanowindow rim or the functional groups, and relaxation also occurs. However, since the cooperation is weak, the effect of relaxation is small ($O_2$ can pass through a nanowindow having a smaller size than its own size).

$N_2$ undergoes strong cooperation with the nanowindow rim or the functional groups, and strong relaxation occurs. Therefore, the effect of relaxation is large ($N_2$ can pass through a nanowindow smaller than its own size more easily than oxygen).

Ar does not undergo cooperation with the nanowindow rim or the functional groups, and therefore, there is no effect of relaxation.

Setting of Simulation Conditions

The realistic behavior of a nanowindow in the molecular scale will be explained by means of MD simulation using a computer, and that will be compared with a simpler model.

The chemical properties of nanowindows present in graphene, particularly the rim thereof (including carbon functional groups having a zigzag or armchair shape) become important factors that determine the permeation rate and selectivity of a graphene membrane for all molecules capable of permeating.

There are several computer simulation results in the literature addressing the calculation of the selectivity and permeation rate of nanowindows, and these computer simulations are realistic similarly to employed membrane models.

However, conventional modeling of nanowindows has been achieved by removing predetermined carbon atoms from a carbon layer, and regarding the interaction, modeling the remaining framework according to dispersion interaction only. This can estimate the order of the magnitude of the permeation energy; however, it is difficult to estimate the permeation rate from this only because the permeation rate and the energy are in an exponential relationship. Furthermore, most of the existing studies ignore the chemical properties of the nanowindows and the rims thereof, and an unprecedented permeation mechanism of a graphene membrane could not be predicted.

A graphene having nanowindows as a model for MD calculation has been modeled by removing carbon atoms from an original graphene layer formed by 640 carbon atoms. Next, exposed ends were passivated with a —H, —OH, or C—O—C terminals.

The nanowindow structure is optimized using MOPAC2016 and PM7 methods, and in a case in which the nanowindow structure just touches the van der Waals' radius of rim edge atoms, the size of the nanowindow is determined as the radius of the largest sphere that is most suitable for the nanowindow.

Figure 8:
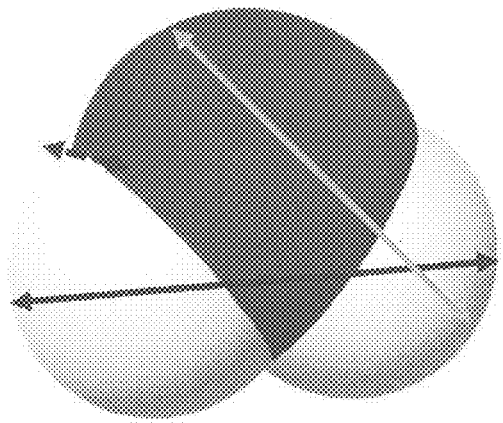
FIG. 8 is explanatory diagrams for three azimuth-dependent sizes of gas molecules, and (a) shows an example of a $H_2O$ model, while (b) shows an example of a $CO_2$ model.
Figure 8:
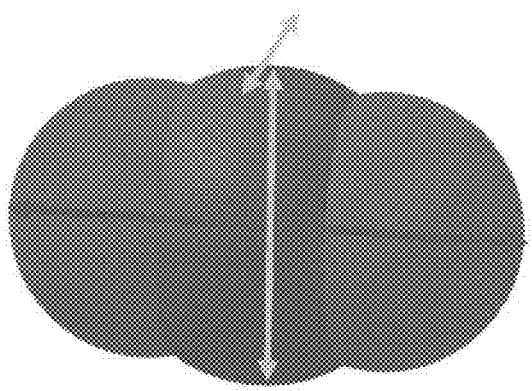

Regarding the effective molecular sizes of $O_2$, $N_2$, and Ar, there is a plurality of options defining the size of a permeating molecule, such as the van der Waals' radius, the size determined from the Lennard-Jones (LJ) potential, or the effective molecular size calculated from the orientation-dependent dimension. However, in the case of such a spatially restricted nanospace, it is most appropriate to define the size of a molecule according to the direction in which the molecule can be employed in a restricted space. As shown in FIGS. 8(a) and 8(b), in order for a molecule to permeate by passing through a narrow opening such as a nanowindow, it is required that smaller two of three orientation-dependent sizes (maximum diameters) of the molecule fit; however, the remaining largest orientation-dependent size (first maximum diameter) is not so important. The smallest two-dimensional shape MIN-2 that is determined by two smaller ones of the orientation-dependent sizes determines the effective molecular size. The MIN-2 sizes of $O_2$, $N_2$, and Ar are 2.99 Å, 3.05 Å, and 3.63 Å, respectively. A practical nanowindow sieve for the separation thereof should be in a range close to the dimensions of these molecules.

For a practical atomic simulation intended to design a highly selective membrane, reflection of chemically proper properties on the rim of graphene nanowindow is essential.

Firstly, the presence of heteroatoms and defects is intended to induce an electric field around the nanowindow rim that has a possibility of interacting with a permeating molecule. This important factor is not explained for simple rigid nanowindows having carbon only.

Furthermore, functional groups such as hydroxyl, carboxyl, and carbonyl have several orientations with respect to a nanowindow. Dynamic orientations thereof change the shape of the nanowindow and strongly affect the permeation mechanism and selectivity thereof.

Molecular Dynamics

Molecular dynamics (MD) simulations were carried out with a molecular dynamics simulation program package, HOOMD. The details are as follows.
Calculation engine: HOOMD
Force field: DREIDING, OPLS-AA
Interaction
Ar: Lennard-Jones potential
$N_2$: Two-center three-charge model considering a quadrupole
$O_2$: Two-center three-charge model considering a quadrupole
Long-range interaction: PPPM
All crossed LJ interactions were calculated using the Lorentz-Berthelot rule.

Regarding the long-range electrostatics, implementation of the PPPM method was employed. The time step used in all simulations was 1.1 fs. The dimensions of a simulation box in the x, y, and z directions were 42.63 Å, 39.38 Å, and 50.00 Å, respectively. A graphene layer was disposed in the x-y plane. Periodic boundary conditions were used in all of the three directions. In order to avoid artificial permeation that passes through periodic boundaries, a reflective LJ wall was disposed at 25 Å from the graphene plane.

The graphene framework and the functional groups of the nanowindow were dealt with as a flexible structure for the MD simulations, except for a cross-section of nanowindow dihedral angle rotation. Here, the system was equilibrated with a fully flexible framework at the system temperature. Next, the framework was rapidly cooled and fixed at a certain time, and the energy was minimized during another equilibrium operation and collection.

Charge Calculation

Calculation of a partial charge distribution and the positive charge was carried out according to a quantum mechanical technique. The details of the calculation method are as follows.
Technique: Merz-Singh-Kollman (MK) scheme
Calculation method: Density functional technique (B3LYP/6-31G (d))
Calculation engine: Gaussian09

Results of MD Simulation

Regarding the nanowindow used in the MD simulation, a nanowindow including functional groups and having a fully flexible graphene framework was produced. This is a practically feasible nanowindow. Six different atomic models of the nanowindow were designed to have an opening size similar to the permeating molecule (see FIG. 1). Their "geometric" sizes were measured according to the van der Waals' radius of carbon atoms and heteroatoms of the rim. The description of each nanowindow is NW-w, w represents the opening size of an MD nanowindow, and w was set to the range of 2.57 to 3.78 Å.

Furthermore, when the nanowindows to be used for the MD simulation were established, the following three conditions were followed. (i) A nanowindow is oxidized in air and is inactivated by H atoms or O atoms. This is a request from the fact that carbon edges that are not inactivated do not exist under conventional conditions. (ii) Heteroatoms were introduced as hydrogen (R—H), phenol (R—OH), and ether (R—O—R'). There are definitely various heteroatoms, and in the present experiment, the heteroatoms were limited to hydrogen (R—H), phenol (R—OH), and ether (R—O—R'), and MD simulations were performed. (iii) The opening size was set between 2.6 Å and 3.8 Å.

Through MD simulations for the permeation of $O_2$, $N_2$, and Ar, it was found that: (i) $O_2$, $N_2$, and Ar can easily permeate nanowindows that are smaller by 10% than themselves, due to the presence of heteroatoms; (ii) an electrostatic field in the order of GV/m is formed within the nanowindow and helps permeation of molecules; and (iii) functional groups can be operated as gates for atoms and selectively limit the permeation of gases.

The permeation rates were calculated for nanowindows of various sizes from MD simulations.

The MD simulations were performed under the condition that there were two compartments separated by a graphene membrane, and that the graphene membrane had nanowindows. One of the two compartments was filled with gas. An MD simulation was started in a state that the other compartment was blank. The permeation rate can be determined as a rate constant.

As the size of the nanowindows increases, the permeation rate increases, and in contrast, selectivity decreases. Therefore, NW-3.78 Å and NW-3.70 Å have high permeation rates and low separation selectivity.

As the size is decreased to 3.3 Å (see NW-3.30 Å in FIG. 1(d)), the Ar permeation rate decreased by a factor of 50, the $N_2$/Ar selectivity increases to 20, and it is shown that an effect as a molecular sieve is obtained.

An important point is that all molecules can permeate nanowindows (NW-2.97 Å) having a much smaller size than the size of the molecules themselves. This increases the $N_2$/Ar selectivity to 28; however, the overall permeation rate decreases (see FIG. 1(c)).

In the case of nano-sized pores having a general slit shape or cylinder shape, when the pore diameter was smaller than the size of a molecule, the molecule could not enter into the nanopores. However, in the case of nanowindows, molecules larger than the nanowindows permeate the nanowindows.

When a molecule passes through a nanowindow, even if the molecule is larger than the nanowindow, a high-energy state occurs only temporarily as a transition state, and the high-energy state can be overcome by fluctuations of the kinetic energy of the molecule that is to permeate. Therefore, even when the geometric size (MIN-2) is larger than the nanowindow itself, the molecule permeates the nanowindow.

This is obvious in the case of nanowindows NW-3.30 Å and NW-2.97 Å (see FIGS. 1(b) and 1(c)).

Even Ar having a size that is larger by at least 10% to 22% than a nanowindow (MIN-2 size 3.63 Å) can penetrate at a proportion of several atoms per microsecond. In these cases, in an MD simulation at 87 K, since the permeation transition temperature subsides in a very short time of less than picoseconds, Ar can permeate the nanowindow beyond this barrier.

Energy Barrier Based on Intermolecular Interaction

An energy profile (see FIG. 2) showing the force of an interaction between a nanowindow and a permeating molecule when the molecule permeates the nanowindow, generally has two minima of energy and one maximum of energy. The maximum of energy acts as a barrier when a molecule permeates a nanowindow.

Since $O_2$ can freely permeate a nanowindow NW-3.30 Å due to its size smaller than that, graphene lacks in-plane permeation barriers (FIG. 2(a)). The energy barrier for permeating a nanowindow having a size similar to a permeating molecule (such as $N_2$ and Ar up to NW-3.30 Å of FIG. 2(a)) is about 3 to 6 kJ/mol (Joules for every mol) (5 to 9 kT).

With regard to Ar, since argon is a noble gas, and an attractive force hardly works in the intermolecular force, the energy profile does not have a minimum, which can be seen for other molecules.

At the time of permeating a narrower nanowindow (NW-2.97 Å of FIG. 2(b)), $O_2$ and $N_2$ respectively face one of energy barriers of 5 kT and 20 kT. The energy contribution is balanced between the constituent elements. However, Ar exhibits ultra-low-speed permeation due to two continuous energy barriers. 21 kT is needed in order to modify functional groups at the time of moving from the basal plane to the upper part of the nanowindow, and then 15 kT is further needed in order to cross the graphene layer and modify the nanowindow.

Heteroatoms of the rim induce a strong electrostatic field within a nanowindow.

The difference in the electronegativities of heteroatoms such as H and O atoms bonded to C among the rim atoms of different nanowindows and carbon atoms induces heterogeneity in the electron density of the atoms constituting the rim of a nanowire, together with the addition of defects of the graphene network. These partial charges along the rim (see FIG. 3(a)) induce an electrostatic field around a nanowindow having a size in the order of GV/m (FIG. 3(b)). This interacts attractively with a molecule having permanent multipoles such as the quadrupole moments of $O_2$ and $N_2$. Examples of the heteroatom to be introduced include nitrogen, oxygen, sulfur, phosphorus, chlorine, iodine, bromine, and boron, and in particular, oxygen and boron act effectively. Due to the difference in electronegativity, oxygen atoms are involved in a donor-like manner, and boron atoms are involved in an acceptor-like manner, with carbon atoms of the nanowindow rim, and an inhomogeneous electron distribution is imparted to the nanowindow rim. Similar effects can also be obtained by addition of a donor substance such as tetrathiafulvalene (TTF) or an acceptor substance such as tetracyanoquinodimethane (TCNQ); however, direct introduction of heteroatoms to the nanowindow rim is direct and highly effective. Furthermore, there are occasions in which defects of carbon atoms (defective parts) may occur in the nanowindow rim as a result of formation of a nanowindow or a treatment for introducing heteroatoms, and this gives an effect similar to the introduction of heteroatoms to the nanowindow rim.

The effect of this large electric field becomes clear from the potential profile when a molecule permeates a nanowindow (see FIG. 2(a)). In the case of $N_2$ (FIG. 2(a), center), an LJ repulsive force of 5.6 kJ/mol is strongly canceled by stabilization by an electrostatic field of −2.7 kJ/mol, and the total amount of energy requirement is only 3.1 kJ/mol. Therefore, it can be said that $N_2$ can permeate much more easily than expected from the size of the nanowindow. However, in the case of Ar that does not have an electrostatic interaction, since the dispersion repulsive force is not mitigated by an electrostatic field, repulsion by the rim atoms of the nanowindow is not alleviated by an electric field (see FIG. 2(a), right).

Breathing Vibration

The rim of a nanowindow is not static and undergoes breathing vibration, and thus the rim behaves as if it breathes and relaxes. This vibration also causes relaxation by allowing the nanowindow rim or functional groups and the permeating molecule to cooperate, in the same manner as the electron distribution.

Graphene has phonon movement and an intrinsic vibration mode, and generates cooperative vibration in the rim of a nanowindow. These vibrations change the effective size and/or shape of the nanowindow and determine the permeation characteristics thereof. The distribution of such a cooperative vibration in the rim can be evaluated by a 2D contour histogram of the distance between facing oxygen atoms (see MD simulation (FIG. 4(a), see the distance atom pair corresponding to FIG. 4(b)). The distance of high concentration is at the center of the plot (that is, O1-O2=6.17 Å and O3-O4=6.54 Å), while thermal energy varies these atomic distances by about ±0.1 Å.

Through the energy calculation taking the dynamic process into account, it is shown that when four O atoms of functional groups move in a consistent manner toward an Ar atom from 3.30 Å to 2.25 Å, a noticeable energy gain at low temperature is 0.5 kJ/mol.

While a $N_2$ molecule permeates a nanowindow, the distance of an O—O pair of functional groups was traced (see the color gradient (gradation) path of FIG. 4(a)). Since bonding vibration is much faster than permeation, there is a large variation in the interatomic distance from the beginning to the end of the orbit. 67% of the permeation orbit occurred when the shorter O—O distance (that is, O1-O2) exceeded the average.

This is explained by an intuitive fact that the nanowindow vibration shape is sterically constrained due to LJ repulsion when the molecule is inside (see FIG. 2(a)). Therefore, gas permeation is achieved as gas molecules are syntonized and cooperate with the nanowindow vibration.

From the shape of the distance histogram, it is clear that the cooperative operation of breathing vibration of the rim is not symmetric. In fact, the Pearson correlation coefficient between the O1-O2 distance and the O3-O4 distance is −0.38, and this means that while one direction of the length of the rim of a nanowindow contracts, one direction perpendicular to this stretches. The vibration of the nanowindow rim cooperating with this permeating molecule is very similar to that observe in the framework dynamics of small pore zeolites as referred to as the "window breathing" mode. In zeolites, it is shown that window breathing significantly affects diffusion of gas molecules and molecular sieving. Then, the effect is also the same for nanowindows on graphene, that is, this asymmetric nanowindow breathing mode is used for a separation based on the molecular shape.

Opening and Closing Based on Rotation of Functional Groups

Free rotation of functional groups of nanowindows and the vibration of the rim form a kind of gate for permeating molecules.

By imitating the nanochannels (grooves) of proteins, it has been demonstrated that a nanowindow having negatively charged carboxylic acid groups exhibits an asymmetric energy profile of ion permeation on both sides of the graphene wall. This was due to different methods of making out different environments on both sides of the graphene wall such that carboxylic acid groups face the graphene plane. Accordingly, in the MD simulation, it is necessary to sample all of nanowindow configurations having high energy efficiency, in consideration of the flexible framework.

Functional groups outside the graphene plane can also dynamically switch the directions thereof. We performed an MD simulation of the change in the permeation rate caused by orientation of functional groups (for example, hydroxyl groups containing O1, O2, O3, and O4 of FIG. 4(b)) at the nanowindow rim. An MD simulation set of $N_2$ permeation (see FIG. 5(a)) through a flexible nanowindow of NW-3.30 Å exhibited very large fluctuations in the permeation rate (10±5 μs$^{-1}$), even for a simulation time of up to 20 nanoseconds.

In conventional studies, the atoms were not constrained, and the complete system could not vibrate. An H atom bonded to O in a hydroxyl group (electrostatically interacting with $N_2$ molecules) has a degree of freedom in the movement along the rotation of the H—O—C—C dihedral angle; however, in the local minimal energy configuration, H is temporarily locked. When a completely flexible simulation is initiated, and the framework of the nanowindow is rapidly cooled at a particular time, the importance of these configurations was disclosed.

Thereby, it has become possible to characterize three different rate regimes of permeation. When the pairs of H—O1 atoms and H—O2 atoms face toward mutually opposite sides in the graphene plane in directions that are separating away, a fast permeation regime (k=28±11 μs$^{-1}$, FIG. 5(b)) is generated (see FIG. 5(e). For the notation of various O atoms, see also FIG. 4(b)), and it is made possible that a larger nanowindow space is opened for permeating $N_2$. In all of these cases, H—O2 formed a favorable environment for permeation by turning to the front side toward FIG. 5. At a moderate permeation rate (k=3.3±0.5 μs$^{-1}$ in FIG. 5(c)), the atom pairs of H—O1 and H—O2 face toward mutually opposite directions outside the graphene plane in directions that are converging, or face toward mutually the same directions outside the graphene plane but in directions that are separating away (see FIG. 5(f)). Lastly, in a slow-speed permeation regime (k=0.1±0.2 μs$^{-1}$, FIG. 5(d)), both the atom pairs point the same directions outside the graphene plane in directions that are converging (see FIG. 5(g)), and therefore behave as atomic gates that block the nanowindow.

In a slow-speed permeation regime, the nanowindow becomes a purely electrostatic gate for the permeation of $N_2$ as a result of twisting of the functional groups H—O1 and H—O2 (since H is modeled as a charging point that lacks dispersion interactions). At this time, it is understood that since the O1-O2 distance is the shortest open distance, not only the O1-O2 distance accomplishes a major role in permeation, but also the positions of H atoms behave as atomic gates for molecules that interact electrostatically. This shows that there is a high possibility of utilizing this effect by including other electrostatic functional groups within the rim of the nanowindow.

Since $O_2$ is smaller than $N_2$, the target size of the nanowindow for observing the strong influence of the movement of the rim functional groups on penetration is also definitely small.

This sieving for $O_2$ must occur in a case in which molecule permeation can be blocked by the rim, that is, at NW-2.73 Å or less (see the decrease in the $O_2$ permeation rate in FIG. 1).

Similarly to the case of $N_2$ described above, MD simulations of permeation in a graphene framework fixed at different energy minima show the importance of the movement of functional groups in a narrower nanospace.

Even at NW-2.73 Å, two different cases of $O_2$ permeation occurred depending on the mutual orientation of hydrogen pairs that face each other within the nanowindow rim.

Figure 6:
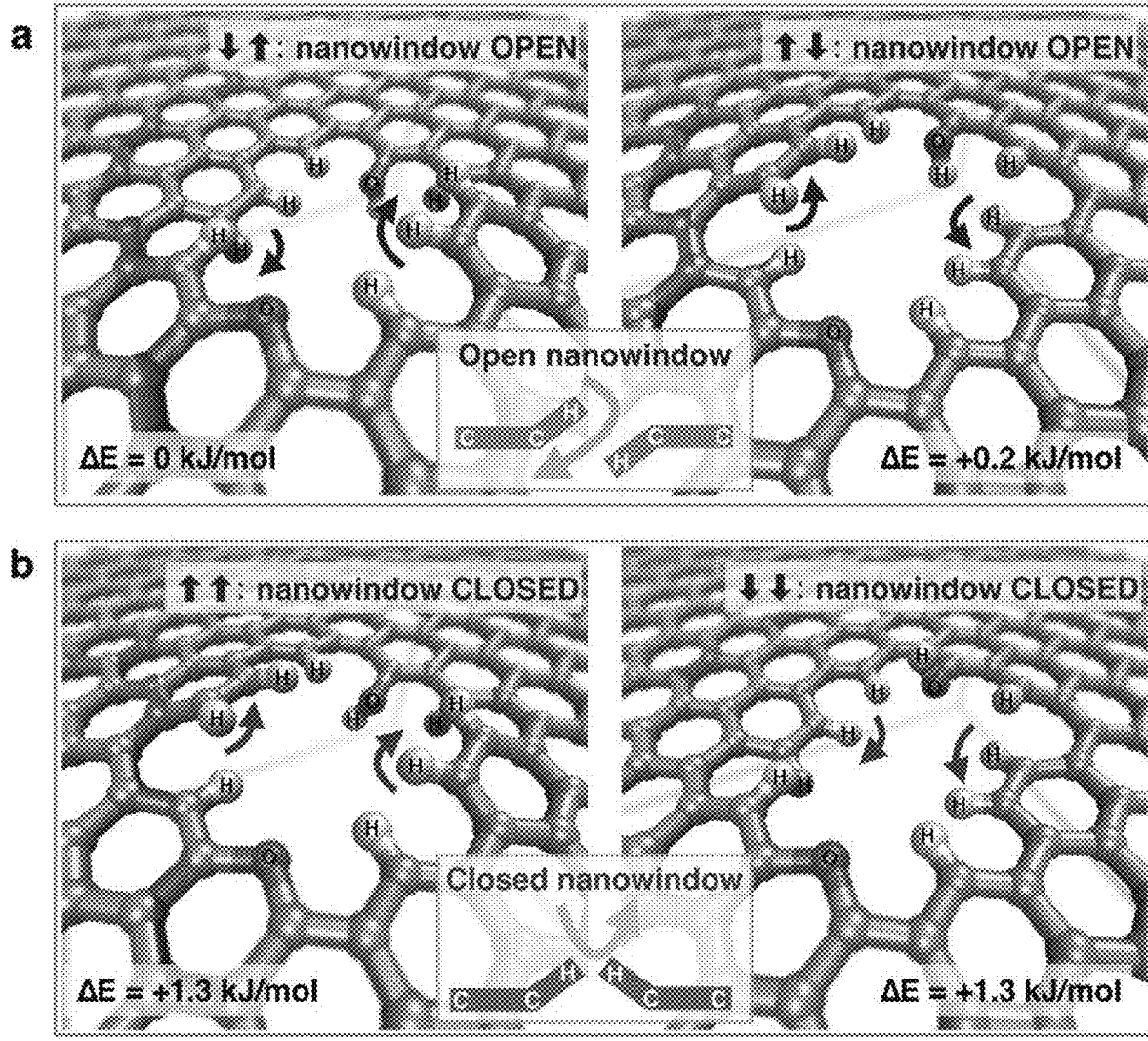
FIG. 6 is explanatory diagrams for the influence of the opening and closing of functional groups on the permeation rate of $O_2$ at 90 K in a nanowindow of NW-2.73 Å, and (a) shows two examples of an open permeable state, while (b) shows two examples of a closed impermeable (atomic gate) state.

In the first case, a slow system that allows permeation of $O_2$ when respective hydrogens open toward the direction opposite to the graphene plane (see FIG. 6(a), rate constant 1.8 μs$^{-1}$) occurs. In the second case, when both hydrogens bend in the same direction as the graphene plane, thus closing the nanowindow and behaving as an atomic gate, an impermeable system (see FIG. 6(b), rate constant<0.001 μs$^{-1}$) occurs.

The position at which the nanowindow is opened is slightly thermodynamically advantageous compared to a closed nanowindow (ΔE=−1.3 kJ/mol).

This is also observed in a plurality of configurations. Since the permeation rate of a gas molecule is affected by contributions from both the closed state and open state of an atomic gate, the permeation rate cannot be correctly evaluated unless an MD simulation using a flapping motion based on the rotation of functional groups and a flexible framework is employed.

Effects

Figure 7:
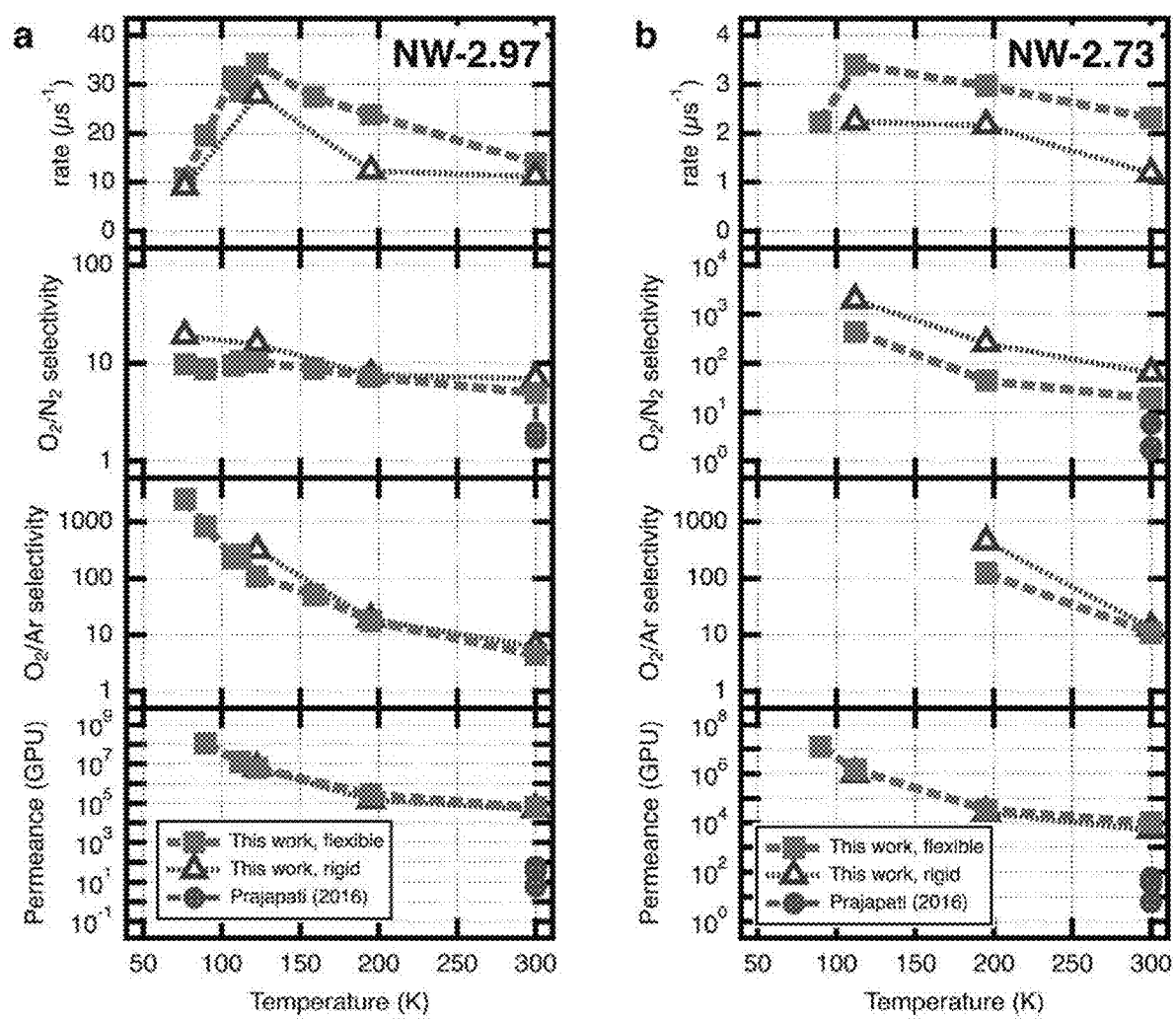
FIG. 7 is graphs showing changes in the permeation rate with temperature, $O_2/N_2$ and $O_2/Ar$ selectivity, and permeance, and (a) shows the case of a nanowindow of NW-2.97 Å, while (b) shows the case of a nanowindow of NW-2.73 Å.

The nanowindows of the present invention have highly selective and ultrafast permeability (FIG. 7).

With regard to the nanowindows of the present invention, the most selective one for oxygen is NW-2.97 Å (see FIG. 1(c)). The permeation rate constant thereof is 47 μs$^{-1}$, this corresponding to 600 m$^3$ STP·min$^{-1}$·m$^{-2}$, and the nanowindow has selectivity higher than 50 times (1,500 times for $O_2$:Ar) for the $O_2$:$N_2$ separation. Carbon molecular sieves can achieve about 30 times for the $O_2$:$N_2$ selection ratio; however, the diffusion limitation is large, and the permeation rate is limited. Commercially available polymers such as polysulfone, polycarbonate, and polyimide can achieve permeation rate selection ratios of about 6 times for $O_2$:$N_2$. However, even the best membranes including polymer membranes containing mixed matrices cannot achieve more than 10 times for the $O_2$:$N_2$ selection ratio. In the separation using such a polymer, only selectivity lower by the order of several-digit magnitude than graphene nanowindows can be obtained.

As a result, the present invention enables reduction to a large extent of the energy cost for molecular separation and the amount of $CO_2$ emission.

In the present invention, it was shown that the behavior of atom-sized graphene nanowindows is very different from the prediction with a simple model of simply removing C atoms from the graphene framework. Spontaneous passivation of C atoms in the rim of a nanowindow having functional groups induces an electrostatic field that interacts with gas molecules having charge or a distribution of charge. Relaxation, breathing vibration, and rotation of functional groups strongly affect the molecular permeation characteristics and enables nanowindows to be changed from atomic gates to permeation.

Explanation of Diagrams

In the various models of FIG. 1, light grey-colored atoms represent carbon (C), dark grey-colored atoms represent oxygen (O), and white atoms represent hydrogen (H). What is represented by NW-x is the van der Waals' diameter ϕ (Å) of a nanowindow. Furthermore, the permeation rate (unit μs⁻¹) shown in FIG. 1(g) was measured by fitting the average of the results obtained in many MD simulations to a first model. As a result of the simulations, it was interpreted that the region with a permeation rate of <0.004 μs⁻¹ are parts through which molecules cannot permeate.

Figure 2:
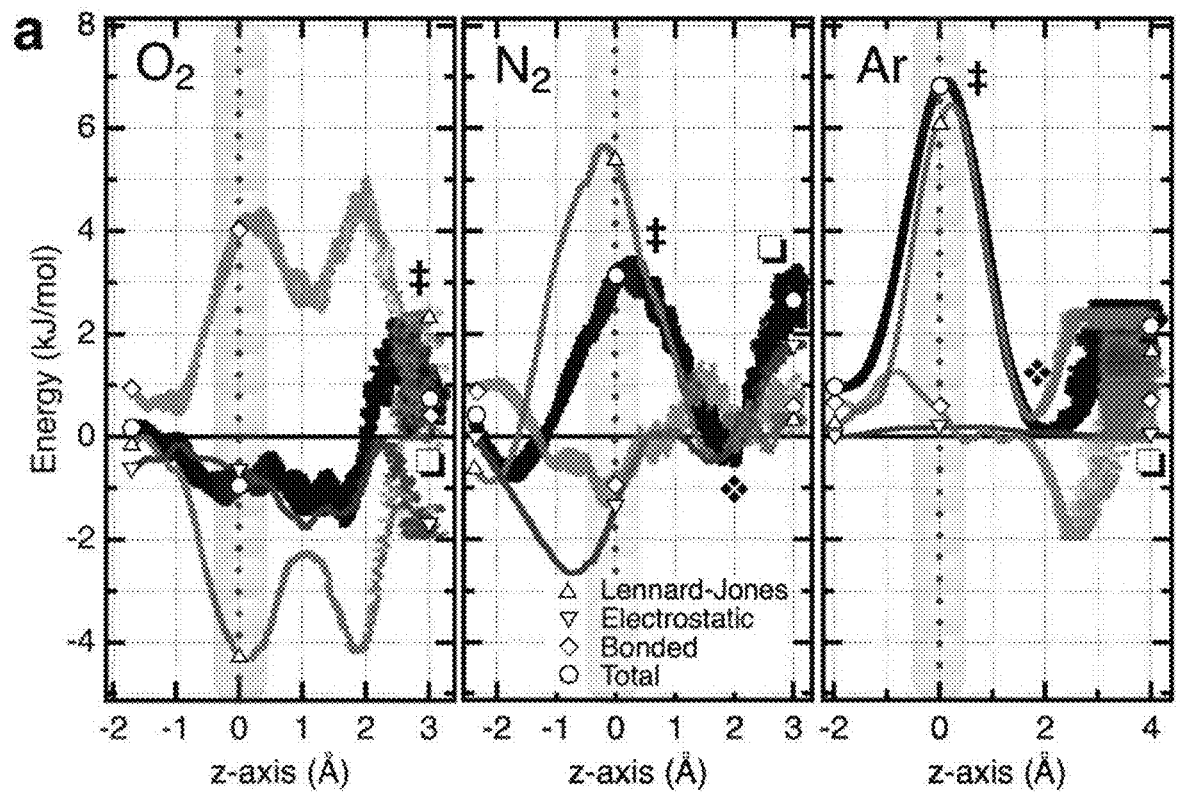
FIG. 2 is graphs showing the enthalpy contribution when various molecules permeate a nanowindow, and (a) shows the case of a nanowindow of NW-3.30 Å, while (b) shows the case of a nanowindow of NW-2.97 Å.
Figure 2:
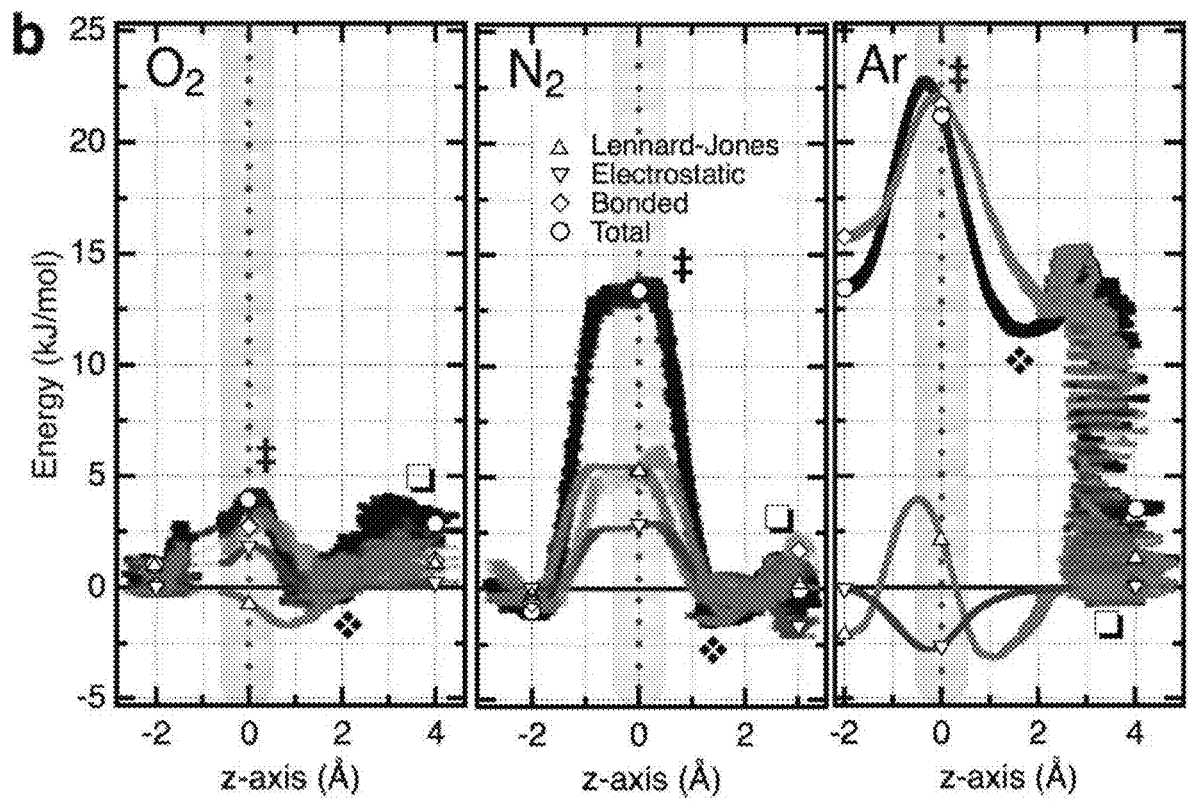

In FIG. 2, a circle (○) represents the interaction when each molecule passes through the nanowindow, and a triangle (Δ), an inverse triangle (∇), and a diamond shape (◇) represent the details thereof. A triangle (Δ) represents the contribution of the intermolecular force between graphene and the molecule. The contribution of the intermolecular force was calculated from the Lennard-Jones potential. An inverse triangle (∇) represents the contribution of an electrostatic interaction between the rim of the nanowindow and each molecule, and a diamond shape (◇) represents the contribution from a bonding interaction. The axis of abscissa represents the distance between the molecule and the nanowindow upon permeating the nanowindow, and the axis of ordinate represents the intermolecular force (repulsive force).

Figure 3:
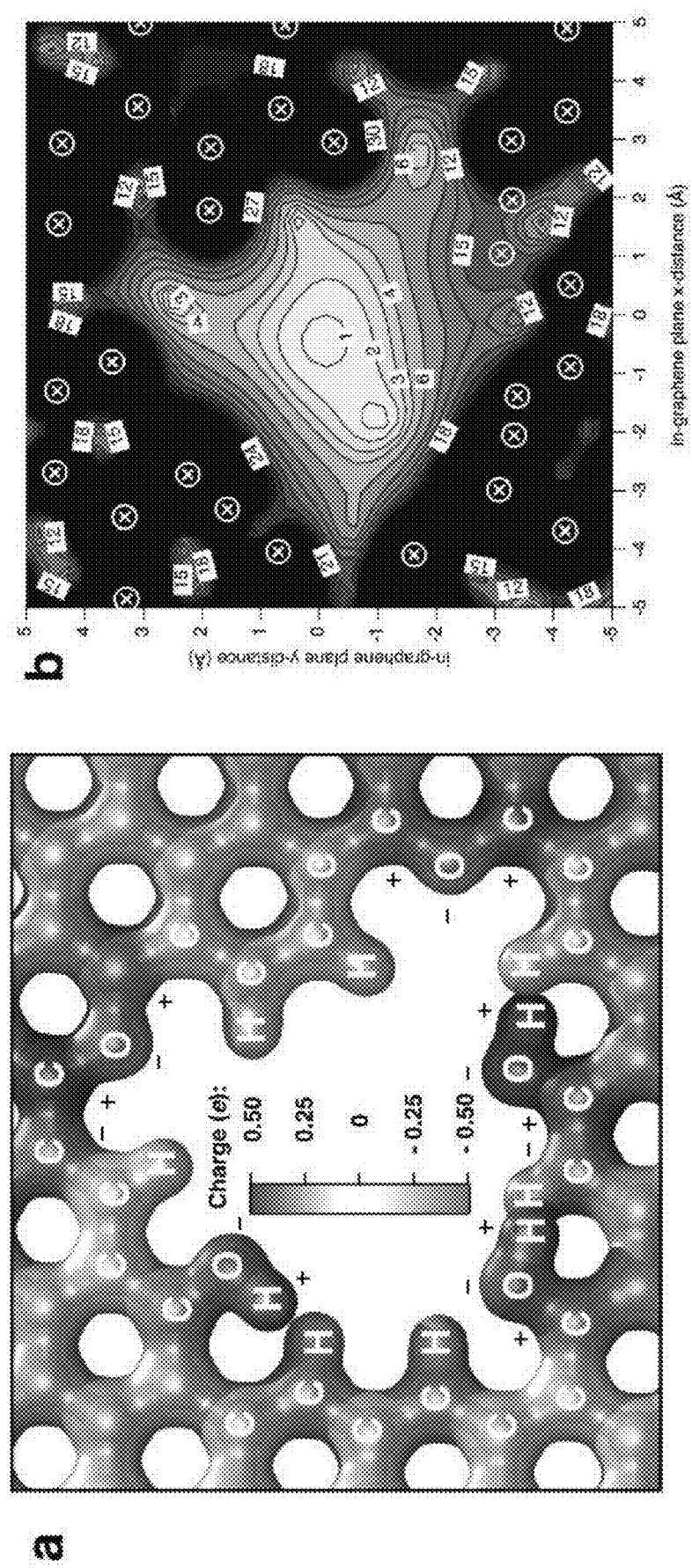
FIG. 3 is explanatory diagrams of a large electrostatic field within a nanowindow of NW-3.78 Å, and (a) shows the partial charge obtained by quantum chemical calculation according to the MK scheme, while (b) shows an in-graphene plane contour diagram of an electric field of GV/m unit calculated from the partial charge.

In FIG. 3(a), a lighter color of an atom means that the charge is closer to zero, a darker color of an atom means that the charge is strongly positive or negative. In FIG. 3(b), a lighter grey color means that the electric field is weaker, and a darker grey color means that the electric field is stronger. Furthermore, in FIG. 3(b), X-marks respectively represent the positions of atoms.

Figure 4:
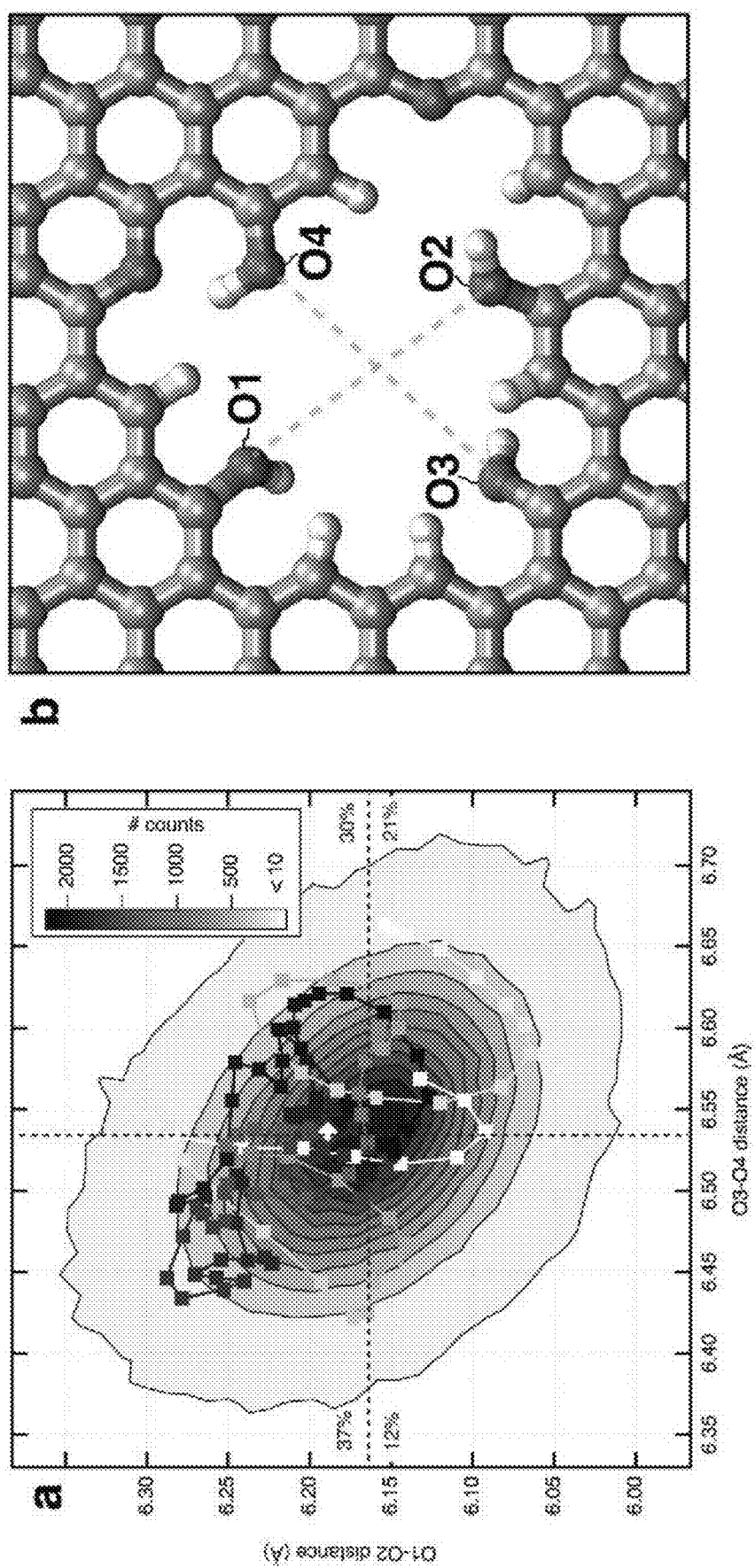
FIG. 4 is diagrams showing breathing-like expansion and contraction in a nanowindow of NW-3.30 Å, and (a) shows a 2D histogram contour of the distance between two pairs of oxygen atoms at opposite extremes of the rim in an MD simulation, while (b) shows the two pairs of oxygen atoms (a pair of O1 and O2 and a pair of O3 and O4) used for the calculation of the length in (a).
Figure 5:
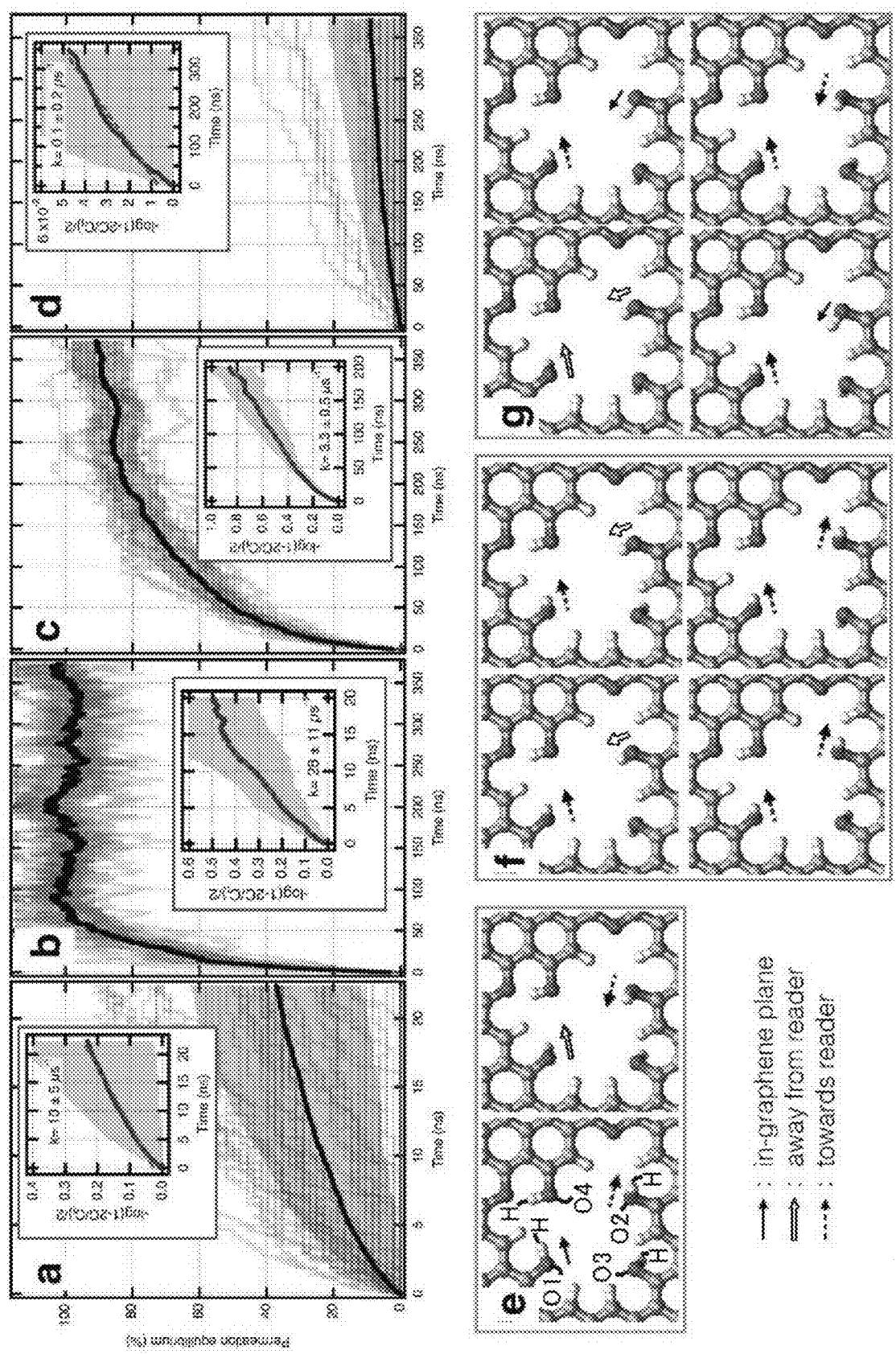
FIG. 5 is explanatory diagrams for the influence exerted on the permeation rate of $N_2$ by the rotation of functional groups of a nanowindow of NW-3.30 Å; (a) to (d) show the results of an MD simulation of $N_2$ permeability at 77 K, (a) shows the entirety of a flexible nanowindow structure, (b) shows a nanowindow structure fixed at a high speed, (c) shows a nanowindow structure fixed at a medium speed, (d) shows a nanowindow structure fixed at a low speed; (e) shows representative orientations of several functional groups in (b), (f) shows representative orientations of several functional groups in (c), and (g) shows representative orientations of several functional groups in (d).

FIG. 4 shows breathing vibration (a vibration contracting and expanding concentrically as if breathing occurs) of the nanowindow. The square color gradient of (a) corresponds to the distance when N₂ molecules permeate the nanowindow, and a darker mark corresponds to the N₂ center closer to the graphene plane. Therefore, the relationship between the distance of N₂ to the graphene and breathing vibration is shown. Furthermore, the shading of the background represents a distribution of the distances between O1-O2 and the distances between O3-O4, and a darker color represents that the frequency of the distance is high. Therefore, regarding the nanowindow of FIG. 4, it is shown that the distance between O1-O2 and the distance between O3-O4 vibrate at an amplitude of about 3.5 Å around 6.16 Å and 6.54 Å, respectively.

In FIGS. 5(a) to 5(d), a thin line represents the result of each execution, a black line represents the average value of all executions, and a shaded area represents the standard deviation for each execution. An inserted small graph is linearization of all data including linear approximation with respect to the average. Furthermore, in FIGS. 5(e) to 5(g), an arrow represents the orientation of O(1-2)-H functional group, a black arrow represents an in-graphene plane orientation, a blank arrow represents an orientation facing backward, and a broken line arrow represents an orientation facing forward.

In the permeation state of FIG. 6(a), a pair of hydrogen atoms at opposite poles face mutually opposite directions with respect to the graphene plane. In the non-permeation (atomic gate) state of FIG. 6(b), a pair of hydrogen atoms at opposite poles face mutually the same direction with respect to the graphene plane. Furthermore, the energy difference ΔE at the lower left corner in each diagram is on the basis (0) of the example on the left side of FIG. 6(a). Light grey color represents carbon (C), dark grey color represents oxygen (O), and white color represents hydrogen (H).

In FIGS. 7(a) and 7(b), the axis of abscissa represents temperature (K), and the axis of ordinate represents, in order from the top, the permeation rate (μs⁻¹), the O₂/N₂ selection ratio, the O₂/Ar selection ratio, and permeance (GPU).

Furthermore, a square (□) represents the result of an MD simulation of the flexible nanowindow of the present invention; a triangle (Δ) represents the result of performing an MD simulation by regarding the entire system as a rigid body in order to make a comparison by excluding the effect of cooperation and relaxation of the nanowindow; and a wheel mark represents a conventional example.

REFERENCE SIGNS LIST

C: carbon atom, O (O1, O2, O3, O4): oxygen atom, H: hydrogen atom.

The invention claimed is:

1. A system for producing a highly pure gas by extracting permeating molecules from a mixed gas including permeating molecules and non-permeating molecules, the system comprising:
   an irradiation source; and
   a graphene nanowindow structure, comprising:
      a nanowindow formed lacking a portion of carbon atoms in graphene; and
      one or more heteroatoms substituting for one or more carbon atoms constituting a rim of this nanowindow,
   wherein an electrostatic field is induced within the nanowindow by the heteroatoms,
   wherein the graphene nanowindow structure can switch between an open state of being permeable to the permeating molecules, and a closed state of being impermeable to the permeating molecules, the open state being obtainable when the rim of the nanowindow is relaxed in cooperation with a permeating molecule having a van der Waals' radius larger than the nanowindow, and
   wherein the irradiation source irradiates the rim of the nanowindow with an electromagnetic wave to switch the graphene nanowindow structure to the closed state of being impermeable to the permeating molecules, the electromagnetic wave comprising infrared radiation.

2. A system for producing a highly pure gas by extracting permeating molecules from a mixed gas including permeating molecules and non-permeating molecules, the system comprising:
   an irradiation source; and
   a graphene nanowindow structure, comprising:
      a nanowindow formed lacking a portion of carbon atoms in graphene; and
      one or more heteroatoms substituting for one or more carbon atoms constituting a rim of this nanowindow,
   wherein breathing vibration is induced in the rim of the nanowindow by the heteroatoms,
   wherein the graphene nanowindow structure can switch between an open state of being permeable to the permeating molecules, and a closed state of being impermeable to the permeating molecules, the open state being obtainable when the rim of the nanowindow is relaxed in cooperation with a permeating molecule having a van der Waals' radius larger than the nanowindow, and
   wherein the irradiation source irradiates the rim of the nanowindow with an electromagnetic wave to switch the graphene nanowindow structure to the closed state of being impermeable to the permeating molecules, the electromagnetic wave comprising infrared radiation.

3. A system for producing a highly pure gas by extracting permeating molecules from a mixed gas including permeating molecules and non-permeating molecules, the system comprising:

an irradiation source; and
a graphene nanowindow structure, comprising:
  a nanowindow formed lacking a portion of carbon atoms in graphene; and
  one or more functional groups added to one or more carbon atoms constituting a rim of this nanowindow,
wherein an electrostatic field is induced within the nanowindow by the functional groups,
wherein the graphene nanowindow structure can switch between an open state of being permeable to the permeating molecules, and a closed state of being impermeable to the permeating molecules, the open state being obtainable when the rim of the nanowindow is relaxed in cooperation with a permeating molecule having a van der Waals' radius larger than the nanowindow, and the closed state being obtainable from the open state by rotating the directions of the functional groups by means of the electrostatic field, and
wherein the irradiation source irradiates the rim of the nanowindow with an electromagnetic wave to switch the graphene nanowindow structure to the closed state of being impermeable to the permeating molecules, the electromagnetic wave comprising infrared radiation.

4. A system for producing a highly pure gas by extracting permeating molecules from a mixed gas including permeating molecules and non-permeating molecules, the system comprising:
an irradiation source; and
a graphene nanowindow structure, comprising:
  a nanowindow formed lacking a portion of carbon atoms in graphene; and
  one or more functional groups added to one or more carbon atoms constituting a rim of this nanowindow,
wherein breathing vibration is induced in the rim of the nanowindow by the functional groups,
wherein the graphene nanowindow structure can switch between an open state of being permeable to the permeating molecules, and a closed state of being impermeable to the permeating molecules, the open state being obtainable when the rim of the nanowindow is relaxed in cooperation with a permeating molecule having a van der Waals' radius larger than the nanowindow, and the closed state being obtainable from the open state by rotating the directions of the functional groups by means of the breathing vibration, and
wherein the irradiation source irradiates the rim of the nanowindow with an electromagnetic wave to switch the graphene nanowindow structure to the closed state of being impermeable to the permeating molecules, the electromagnetic wave comprising infrared radiation.

5. A method for producing a highly pure gas by extracting permeating molecules from a mixed gas including permeating molecules and non-permeating molecules,
the method comprising:
supplying the mixed gas to a graphene having a nanowindow having a van der Waals' radius smaller than the permeating molecules and the non-permeating molecules and also having, in a rim of this nanowindow, one or more of a functional group, a heteroatom, or a defective part, all of the functional group, heteroatom, and defective part cooperating with the permeating molecules;
bringing an open state of allowing the permeating molecules to permeate the nanowindow while preventing permeation of the non-permeating molecules, through relaxation of the nanowindow as a result of cooperation between the permeating molecules and the functional group, the heteroatom, or the defective part; and
collecting the permeating molecules, the permeating molecules having permeated the nanowindow; and
irradiating, using an irradiation source, the rim of the nanowindow with an electromagnetic wave to switch from the open state to a closed state of being impermeable to the permeating molecules, the electromagnetic wave comprising infrared radiation.

6. The system of claim 1, wherein applying an electric charge to the rim of the nanowindow also switches the graphene nanowindow structure to the closed state of being impermeable to the permeating molecules.

7. The system of claim 2, wherein applying an electric charge to the rim of the nanowindow also switches the graphene nanowindow structure to the closed state of being impermeable to the permeating molecules.

8. The system of claim 3, wherein applying an electric charge to the rim of the nanowindow also switches the graphene nanowindow structure to the closed state of being impermeable to the permeating molecules.

9. The system of claim 4, wherein applying an electric charge to the rim of the nanowindow also switches the graphene nanowindow structure to the closed state of being impermeable to the permeating molecules.

10. The system of claim 1, further comprising a graphene membrane having the graphene nanowindow structure.

11. The method for producing a highly pure gas according to claim 5, further comprising applying an electric charge to the rim of the nanowindow to switch from the open state to the closed state of being impermeable to the permeating molecules.

12. The method for producing a highly pure gas according to claim 5, wherein the mixed gas is air.

13. The method for producing a highly pure gas according to claim 5, wherein the highly pure gas is nitrogen.

14. The system of claim 2, further comprising a graphene membrane having the graphene nanowindow structure.

15. The system of claim 3, further comprising a graphene membrane having the graphene nanowindow structure.

16. The system of claim 4, further comprising a graphene membrane having the graphene nanowindow structure.

17. The system of claim 6, further comprising a graphene membrane having the graphene nanowindow structure.

18. The system of claim 7, further comprising a graphene membrane having the graphene nanowindow structure.

* * * * *